United States Patent
Meier et al.

(10) Patent No.: US 6,528,576 B1
(45) Date of Patent: Mar. 4, 2003

(54) TREATMENT AGENTS FOR TEXTILES, METHOD OF PRODUCING SAME AND THEIR USE

(75) Inventors: Helmut-Martin Meier, Ratingen (DE); Ferdinand Kümmeler, Leverkusen (DE); Detlev Kierspe, Langenfeld (DE); Peter Selinger, Leverkusen (DE); Jacob-Cornelis Dijks, Bergisch Gladbach (DE); Winfried Guth, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,448

(22) PCT Filed: Mar. 16, 2000

(86) PCT No.: PCT/EP00/02331

§ 371 (c)(1),
(2), (4) Date: Sep. 26, 2001

(87) PCT Pub. No.: WO00/58547

PCT Pub. Date: Oct. 5, 2000

(30) Foreign Application Priority Data

Mar. 29, 1999 (DE) .......................... 199 14 299
Dec. 14, 1999 (DE) .......................... 199 60 107

(51) Int. Cl.$^7$ .............................. C08J 3/00; C08K 3/00; C08L 75/00; B32B 27/04; B32B 3/00
(52) U.S. Cl. ................. 524/589; 427/372.2; 427/385.5; 428/423.1; 524/590; 524/591; 524/839; 524/840; 442/43; 442/59
(58) Field of Search ................. 524/591, 839, 524/840, 589, 590; 428/423.1; 427/372.2, 385.5; 442/43, 59

(56) References Cited

U.S. PATENT DOCUMENTS

| | | | |
|---|---|---|---|
| 2,462,031 A | 2/1949 | Wittcoff | 260/333 |
| 3,898,197 A | 8/1975 | Guise et al. | 260/77.5 TB |
| 3,984,365 A | 10/1976 | Lienert et al. | 260/29.2 TN |
| 4,149,978 A | 4/1979 | Goffinet | 252/8.8 |
| 4,446,034 A | 5/1984 | Kolbe et al. | 252/8.8 |
| 4,531,946 A | 7/1985 | Christie et al. | 8/192 |
| 6,177,367 B1 | 1/2001 | Mathis | 442/118 |

FOREIGN PATENT DOCUMENTS

| | | |
|---|---|---|
| DE | 2414470 | 10/1975 |
| EP | 075550 | 4/1983 |
| EP | 641833 | 3/1995 |
| EP | 417559 | 6/1995 |
| EP | 696661 | 2/1996 |
| GB | 1062564 | 3/1967 |
| JP | 9195167 | 7/1997 |
| WO | 99/05246 | 2/1999 |

OTHER PUBLICATIONS

Melliand Textilberichte, Sep. 1990, pp. 699–705, P. Hardt, "Umweltfreundiiche Textilweichmacher".
British Library, vol. 1, (month unavailable), 1949, pp. 118–173, Schwartz–Perry, "Surface Active Agents, Their Chemistry and Technology".
Cationic Surfactants (month unavailable) 1970, pp. 29–31, E. Jungerman, "VII. Preparation of Quaternary Ammonium Compounds".
Tenside–Textilhilfsmittel–Waschrohstoffe, vol. 1, 2nd ed., (month unavailable) 1964, pp. 904–933, "4. Die Acylierten Alkanolamine und ihre Addukte".

*Primary Examiner*—Patrick D. Niland
(74) *Attorney, Agent, or Firm*—Godfried R. Akorli; Richard E. L. Henderson

(57) ABSTRACT

The invention relates to textile treatment compositions containing (K1) mixtures of
  (A) 0 to 30% by weight of polyalcohols obtained by catalyzed reaction of formaldehyde with ketones bearing at least 4 replaceable hydrogen atoms adjacent to the carbonyl group,
  (B) 0 to 30% by weight of polyalcohols other than (A),
  (C) 0.1 to 10% by weight of adducts of fatty acids, fatty alcohols, alkyl- or dialkylamines, or alkylphenols with 2 to 100 mol of ethylene oxide, and
  (D) 70 to 99.9% by weight of an aqueous softener formulation containing 10 to 90% by weight of softener compounds based on the aqueous softener formulation, wherein the total amount of (A)+(B) is $\geq 0.1\%$ by weight, based on the sum total of the individual components (A) to (D), and (K2) a bisulphite-blocked polyisocyanate prepolymer, wherein the weight ratio of component K1 to component K2 is 0.1:1 to 5:1.

22 Claims, No Drawings

TREATMENT AGENTS FOR TEXTILES, METHOD OF PRODUCING SAME AND THEIR USE

Textile treatment compositions, preparation thereof and use thereof The invention relates to textile treatment compositions including bisulphite-blocked polyisocyanate prepolymers and specific softener formulations, to a process for preparing these textile treatment compositions and to their use.

The handle modification of textile materials is a very important field. Similarly, equipping textile materials to resist shrinkage under the influence of moisture is an important part of textile resin finishing. DE-C-24 14 470 describes for example the finishing of textile materials with bisulphite-blocked polyisocyanate prepolymers. These bisulphite-blocked polyisocyanate prepolymers are prepared by reacting polyisocyanates with polyhydroxy compounds and subsequently blocking the isocyanate end groups with bisulphite. Since bisulphite-blocked polyisocyanate prepolymers are self-crosslinking compounds, there is no need to add catalysts in the finishing step. However, it is disadvantageous that bisulphite-blocked polyisocyanate prepolymers do not perform equally well in all existing textile finishing processes.

U.S. Pat. No. 3,898,197 and GB-A-1,062,564 each disclose bisulphite-blocked polyisocyanate prepolymers useful for modifying keratinous fibres.

However, when bisulphite-blocked polyisocyanate prepolymers are used to provide shrink resistance to and influence the handle of textile materials they generally also significantly reduce the softness of the finished materials. This is why it is customary to include softeners in the finish which make good this disadvantage. The various known softener types and their properties are reviewed by P. Hardt in Melliand Textilberichte 9/1990, p. 699.

JP 09195167 A2 discloses in particular cationic softener compositions comprising polyhydric alcohols. DE-A-19 629 666 describes the use of alkylpolyglycosides for hydrophilicizing polypropylene and polyester fibres. DE-A-31 38 181 describes softener mixtures which include fatty acid amides.

The use of these substances in the finish confers a very soft handle on the textile materials. But known softeners all have the disadvantage that they generally contain a long hydrophobic moiety. This hydrophobic moiety is in turn responsible for the poor water-absorbing properties of the treated textiles. This hydrophobicity is unwelcome especially in the case of towels, bathrobes and terry material.

It is an object of the present invention to provide a self-crosslinking textile treatment composition whereby the textile material is simultaneously provided with good hydrophilicity, a good soft handle and a high surface smoothness. In addition, the textile treatment composition shall be very widely usable in all existing textile finishing processes and, in particular, have such a liquor stability that it can be applied to textiles via jet dyeing machines.

The invention provides textile treatment compositions characterized in that they include two components K1 and K2 in a weight ratio of (0.1–5):1,
where K1 is a mixture which includes
(A) 0–30% by weight of polyalcohols obtainable by the reaction of formaldehyde with ketones bearing at least 4 replaceable hydrogens adjacent to the carbonyl group, in the presence of alkaline catalysts,
(B) 0–30% by weight of polyalcohols which have at least two OH groups and do not come within the definition of A), (C) 0.1–10% by weight of adducts of $C_{12}$–$C_{22}$ fatty acids or $C_8$–$C_{18}$ fatty alcohols or $C_{12}$–$C_{36}$-alkyl- or di-($C_{12}$–$C_{36}$)-alkyl-amines or $C_9$–$C_{24}$-alkylphenols with 2–100 mol of ethylene oxide, and
(D) 70–99.9% by weight of an aqueous softener formulation which includes 10–90% by weight of softener compounds, based on the aqueous softener formulation, where (A)+(B)≧0.1% by weight, based on the sum total of the individual components (A) to (D),
and the component K2 is a polyisocyanate prepolymer whose isocyanate groups are present in bisulphite-blocked form.

The polyalcohols (A) of component K1 are obtainable by reacting formaldehyde with ketones bearing at least 4 replaceable hydrogen atoms adjacent to the carbonyl group, in the presence of alkaline catalysts.

The ketones preferably have the general formula (1)

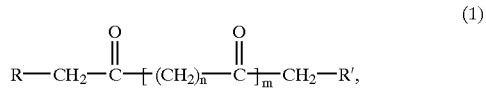

where

R and R' are independently straight-chain or branched $C_1$–$C_{24}$-alkyl, $C_1$–$C_{24}$-alkenyl, phenyl or naphthyl radicals or R and R' combine to form an alkylene radical —(—$CH_2$—)—$_p$ where p=2–6 and one or two $CH_2$ groups may be replaced by a hetero atom, preferably oxygen, m is 0 or 1, and n is 0, 1, 2, 3 or 4.

Preferably R and R' are independently —$CH_3$, —$C_2H_5$, —$C_3H_7$, —i—$C_3H_7$, —$C_4H_9$, —$CH=C(CH_3)_2$ or combine to form an alkylene radical

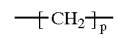

where p=2 or 3.

The straight-chain or branched $C_1$–$C_{24}$-alkyl and $C_1$–$C_{24}$-alkenyl groups of R and R' are optionally substituted by OH, COOH or $SO_3H$. Similarly, the phenyl or naphthyl radical may be substituted by OH, COOH or $SO_3H$. Thusly substituted R and R' preferably have the formulae —$CH_2$–COOH and —$CH_2$–C($CH_3$)$_2$(OH).

Useful ketones are particularly alicyclic ketones, such as cyclopentanone and cyclohexanione; similarly, aliphatic ketones such as acetone, methyl ethyl ketone, methyl propyl ketone, methyl isopropyl ketone, methyl butyl ketone, methyl isobutyl ketone, methyl sec-butyl ketone, mesityl oxide, diacetone alcohol, laevulinic acid, diethyl ketone, diacetyl, acetylacetone, acetonylacetone or methyl benzyl ketone are particularly suitable.

Formaldehyde can be used in the form of paraformaldehyde, trioxymethylene or a formaldehyde polymer which releases formaldehyde under reaction conditions.

The polyalcohols (A) of component K1 are particularly preferably compounds of the formulae 2(1) to 2(8), which are obtainable via the abovementioned reaction:

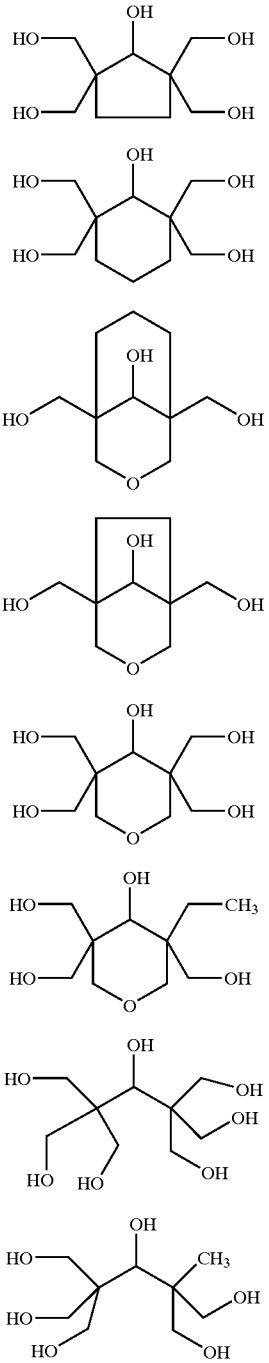

2(1)
2(2)
2(3)
2(4)
2(5)
2(6)
2(7)
2(8)

Examples of suitable alkaline catalysts are oxides or hydroxides of the alkali or alkaline earth metals. Preference is given to the use of alkaline earth metal hydroxides, especially calcium hydroxide.

The preparation of the polyalcohols (A) is described in general terms in U.S. Pat. No. 2,462,031 incorporated herein by reference.

The polyalcohols (B) of component K1 possess at least two OH groups and do not come within the definition of the polyalcohols (A).

Examples of suitable polyalcohols (B) are pentaerythritol, neopentyl glycol, ethylene glycol, diethylene glycol, triethylene glycol, trimethylolpropane, glycerol, polyglycerol, dipentaerythritol, diglycerol, glucose or carbohydrates having more than 2 OH groups.

The ethylene oxide adducts (C) of component K1 are adducts of $C_{12}$–$C_{22}$ fatty acids or $C_8$–$C_{18}$ fatty alcohols or $C_{12}$–$C_{36}$-alkyl- or di-($C_{12}$–$C_{36}$)-alkyl-amines or $C_9$–$C_{24}$-alkylphenols with 2–100 mol of ethylene oxide (see, for example, Tensid-Taschenbuch by W. Stache, 2nd Edition, 1981, p. 617–662).

Particularly preferred ethylene oxide adducts (C) are for example adducts of stearyl alcohol with 19, 56 or 95 mol of ethylene oxide, of oleyl alcohol with 19, 56 or 95 mol of ethylene oxide, of stearic acid with 6.5, 8.5 or 10 mol of ethylene oxide, of oleic acid with 6.5, 8.5 or 10 mol of ethylene oxide or of tallowamine with 2, 4.5, 10, 22 or 25 mol of ethylene oxide.

The components included in the aqueous softener formulation (D) are for example extensively described in DE-A 31 38 181 (counterpart of US-A 4,446,034, incorporated by reference). These are for example aqueous mixtures M1 including 50–80% by weight of the component (I) which comprises acylated alkanolamines obtainable by reacting saturated or unsaturated $C_{12}$–$C_{22}$-carboxylic acids and alkanolamines containing 1 or 2 nitrogen atoms, 1–3 OH groups and 2–6 carbon atoms, in a molar ratio of (1–3):1, 10–30% by weight of the component (II) which comprises water-soluble, quaternary ammonium salts of the general formula (3)

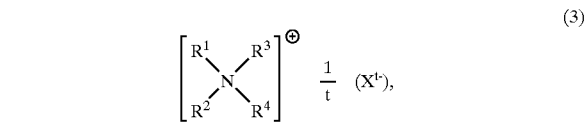

(3)

wherein
$R^1$ is a $C_{14}$–$C_{25}$-alkyl- or -alkenyl radical which is interrupted by an amide and/or ester group,
$R^2$ is a radical with the meaning of $R^1$ or a $C_1$–$C_4$-alkyl radical,
$R^3$ and $R^4$ are independently a $C_1$–$C_4$-alkyl radical, a hydroxyethyl, a hydroxypropyl or a benzyl radical, and
$X^{t-}$ is an anion with t negative charges, where t is 1, 2 or 3,
2–20% by weight of the component (III) which comprises fatty acid esters of saturated or unsaturated $C_{12}$–$C_{22}$ fatty acids or saturated or unsaturated $C_4$–$C_{10}$-dicarboxylic acids and mono- to tetrahydric $C_3$–$C_{20}$ alcohols,
2–20% by weight of the component (IV) which comprises ethylene oxide adducts of $C_{12}$–$C_{22}$ fatty acids or $C_8$–$C_{18}$ fatty alcohols or $C_{12}$–$C_{36}$-alkyl- or di-($C_{12}$–$C_{36}$)-alkyl-amines or $C_9$–$C_{24}$-alkylphenols with 2–100 mol of ethylene oxide, and
0–25% by weight of the component (V) which comprises diorganopolysiloxanes having a viscosity of 1000 to 100,000 $mm^2/s$,
where all the aforementioned weight %ages are each based on the total mixture M1 and the sum total of the components (I) to (V) in the mixture M1 is 10–90% by weight.

The acylated alkanolamines (I), described for example in K. Lindner "Tenside-Textilhilfsmittel-Waschrohstoffe", 2nd Edition, Volume 1, pages 904 and 993, and in Schwartz-Perry "Surface Active Agents" 1949, Vol. 1, p. 173, contain amide and/or ester groups, depending on the alkanolamines used.

They are prepared using carboxylic acids of natural or synthetic origin, for example lauric acid, myristic acid, palmitic acid, stearic acid, behenic acid, oleic acid or mixtures thereof, as for example mixtures of coconut oil, palm kernel oil or tallow, or branched-chain acids from the oxo process, for example isostearic acid, or the acyl chlorides of these carboxylic acids. Preference is given to using stearic acid and behenic acid of technical grade quality.

Suitable alkanolamines of 1–3 OH groups and 2–6 carbon atoms include mono-ethanolamine, diethanolamine, triethanolamine, N-methyldiethanolamine, N-(2-aminoethyl)ethanolamine, 1-aminopropanol and bis(2-hydroxypropyl)amine. Particular preference is given to using N-(2-aminoethyl)ethanolamine, mono-ethanolamine and diethanolamine.

The water-soluble quaternary ammonium salts (II) contain a hydrophobic moiety in the form of at least one $C_{14}$–$C_{25}$-alkyl or -alkenyl chain which is interrupted by an amide and/or ester group. They are prepared according to known methods, described for example in Schwartz-Perry "Surface Active Agents", 1949, Vol. 1, p. 118 and in E. Jungermann "Cationic Surfactants" 1970, p. 29, by acylating mono-, di- or triamines which contain a tertiary amino group and one or two primary amino groups and/or one or two OH groups with the acids mentioned under (I) and subsequently quaternizing the products in a suitable manner.

$R^1$ in the formula (3) is preferably $R^5$—CO—Y—$R^6$—, where R5 is an alkyl or alkenyl radical of 12 to 22 carbon atoms, $R^6$ is an ethylene or propylene radical and Y is NH or O.

The anion $X^{t-}$ in the formula (3) is preferably chloride, bromide, sulphate, phosphate, methosulphate or dimethyl phosphite.

Examples of suitable amines for preparing (II) are 3-amino-1-dimethylamino-propane, 3-amino-i-diethylamino-propane, methyl-bis-(3-amino-propyl)-amine, bis-(2-methylamino-ethyl)-methylamine, 2-dimethylamino-ethanol, methyl-bis-(2-hydroxy-ethyl)-amine or 3-dimethylamino-1-propanol.

Preferred compounds (II) are reaction products of technical grade stearic acid or behenic acid with 3-amino-1-dimethylamino-propane or 3-amino-1-diethylamino-propane which are quaternized with dimethyl sulphate or dimethyl phosphite.

The quaternization is effected according to customary methods without solvent or in a solvent, in which case, as well as water or ethanol, the acylated alkanolamines (I) in molten form are useful as solvent, provided they do not contain a tertiary nitrogen atom.

Examples of suitable quaternizing agents are methyl chloride, dimethyl sulphate, dimethyl phosphite or ethylene oxide, in the latter case the reaction being carried out in a solution rendered acidic with sulphuric acid or phosphoric acid.

The products of the two groups (I) and (II) can also be prepared in a one-pot process by using mixtures of the amines mentioned for the two groups in the reaction with fatty acids and subsequently quaternizing the fraction of tertiary amino groups appropriately.

The carboxylic esters (III) are prepared using mono- to tetrahydric $C_3$–$C_{20}$ alcohols. The alkyl chain of these alcohols may also be interrupted by oxygen.

Examples of the carboxylic esters (III) are butyl stearate, 2-ethylhexyl stearate, octadecyl stearate, isotridecyl stearate, 2-ethylhexyl oleate, di-2-ethylhexyl sebacate, pentaethylene glycol dilaurate, trimethylolpropane trilaurate and pentaerythritol tetrapelargonate.

The components (I), (II) and (III) are softener compounds.

The solubility of the mixtures of softener compounds is improved by using as component (IV) ethylene oxide adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkyl-amines or $C_9$–$C_{24}$-alkylphenols. This component (IV) likewise has softener properties owing to the long alkyl radicals. The optimal degree of alkoxylation will vary from case to case and may be 2–100 mol of ethylene oxide per mole of starting material.

If necessary, the mixtures of softener compounds may be admixed with emulsion-polymerized diorganopolysiloxanes (V) having viscosities of 1000 to 100,000 mm²/s. These diorganopolysiloxanes are customarily used as aqueous emulsions and likewise have softener properties. Polydimethylsiloxanes are preferred.

In a further embodiment, the aqueous mixture M1 further includes

1–30% by weight of a component (VI) which is an oxidized polyethylene wax emulsion, this weight % age of the component (VI) too being based on the total mixture M1 and the sum total of the components (I) to (VI) in the mixture M1 being 10–90% by weight.

These oxidized polyethylene wax emulsions (VI) customarily have an acid number of from 10 to 60 mg of KOH/g and are described for example in DE-A-30 03 851 and DE-A-28 30 173 (counterparts of U.S. Pat. No. 4,329,390 and U.S. Pat. No. 4,149,978, respectively, which are hereby expressly incorporated by reference).

The aqueous softener formulation (D) can also be a mixture M2 including

2–20% by weight of the component (IV) already defined for the mixture M1,

0–25% by weight of the component (V) already defined for the mixture M1 and

1–30% by weight of the component (VI) already defined for the mixture M1, where all the aforementioned weight % ages are each based on the total mixture M2 and the sum total of the components (IV), (V) and (VI) in the mixture M2 is 10–90% by weight.

The aqueous softener formulation (D) can also be a mixture M3 including

50–80% by weight of the component (I) already defined for the mixture M1,

10–30% by weight of the component (II) already defined for the mixture M1,

2–20% by weight of the component (III) already defined for the mixture M1,

1–20% by weight of the component (IV) already defined for the mixture M1,

1–30% by weight of the component (VI) already defined for the mixture M1, and

1–20% by weight of a component (VII) which is a cationic emulsifier obtained by adduct formation of 2–20 mol ethylene oxide and/or propylene oxide with a $C_{10}$–$C_{22}$-alkylamine in the presence of an organic or inorganic acid, where all the aforementioned weight % ages are each based on the total mixture M3 and the sum total of the components (I), (II), (III), (IV), (VI) and (VII) in the mixture M3 is 10–90% by weight.

The cationic emulsifier (VII) contained in the mixture M3 is obtained by adduct formation of 2–20 mol ethylene oxide and/or propylene oxide with a $C_{10}$–$C_{22}$-alkylamine in the presence of an organic or inorganic acid. The organic or inorganic acid may be for example formic acid, acetic acid, phosphoric acid, phosphorous acid, hydrochloric acid, sulphuric acid or sulphurous acid.

The aqueous softener formulation (D) can also be a mixture M4 including
- 1–20% by weight of the component (IV) already defined for the mixture M1,
- 1–30% by weight of the component (VI) already defined for the mixture M1, and
- 1–20% by weight of the component (VII) already defined for the mixture M3, where all the aforementioned weight % ages are each based on the total mixture M4 and the sum total of the components (IV), (VI) and (VII) is 10–90% by weight.

The aqueous softener formulation (D) can also be a mixture M5 including
- 0.1–5% by weight of the component (IV) already defined for the mixture M1,
- 60–90% by weight of the component (VI) already defined for the mixture M1,
- 1–10% by weight of a component (VIII) which is a branched polysiloxane/poly-ether copolymer,
- 0.5–5% by weight of a component (IX) which is an organic phosphoric acid salt, and
- 0–1% by weight of scents (X), where all the aforementioned weight % ages are each based on the total mixture M5 and the sum total of the components (IV), (VI) and (VIII) in the mixture M5 is 10–90% by weight.

Component (VIII) is a branched polysiloxane/polyether copolymer. An example of a suitable branched polysiloxane/polyether copolymer is one obtainable by reacting octamethyltetrasiloxane, methyltrichlorosilane and polyglycols formed from ethylene oxide and/or propylene oxide, started on alkanols, preferably butanol, and having a hydroxyl number of 20–40 mg of KOH/g.

Component (IX) is, for example, organic phosphoric acid salts formed from mono- or di-($C_1$–$C_{18}$-alkyl) phosphates and hydroxy-($C_1$–$C_4$)-alkyl-amines. It is also possible to use alkali or alkaline earth metal phosphates.

The aqueous softener formulation (D) can also be a mixture M6 including
- 50–80% by weight of the component (I) already defined for the mixture M1,
- 10–30% by weight of the component (II) already defined for the mixture M1
- 2–20% by weight of the component (III) already defined for the mixture M1,
- 1–20% by weight of the component (IV) already defined for the mixture M1, and
- 1–80% by weight of a component (XI) which is a polydimethylsiloxane having a viscosity of less than 40 mPas at 23° C., where all the aforementioned weight % ages are each based on the total mixture M6 and the sum total of the components (I), (II), (III), (IV) and (XI) in the mixture M6 is 10–90% by weight.

The aqueous softener formulation (D) can also be a mixture M7 including
- 1–20% by weight of the component (IV) already defined for the mixture M1 and
- 1–80% by weight of the component (XI) already defined for the mixture M5, where all the aforementioned weight % ages are each based on the total mixture M7 and the sum total of the components (IV) and (XI) in the mixture M7 is 10–90% by weight.

The aqueous softener formulation (D) can also be a mixture M8 including
- 0.1–20% by weight of the component (IV) already defined for the mixture M1,
- 0–25% by weight of the component (V) already defined for the mixture M1
- 5–40% by weight of a component (XII) which is an aminosilicone, where all the aforementioned weight % ages are each based on the total mixture M8, and further
- 1–40% by weight based on the component (XII) of an amphoteric surfactant (XII) and
- 0–50% by weight based on the component (XII) of a straight-chain or branched monohydric $C_1$–$C_{18}$ alcohol (XIV), where the sum total of the weight % ages of the components (IV), (V) and (XII) in the mixture M8 is 10–90% by weight.

Useful aminosilicones (XII) include all customary and commercially available aminosilicones which are liquid at room temperature, suitable aminosilicones being preferably N-modified, particularly preferably N-acylated, especially N-formylated. By N-acylation is meant the introduction of the radical —COR or —CONRR (R=H or $C_1$–$C_{18}$-alkyl). Such aminosilicones are extensively described in EP-A-0 417 559, for example.

Useful amphoteric surfactants (XIV) include all known and commercially available surfactants. Preference is given to using those of the class of the $C_8$–$C_{24}$-alkylamine oxides.

The straight-chain or branched monohydric $C_1$–$C_{18}$ alcohols (XIV) can be for example aliphatic, cycloaliphatic, araliphatic alcohols or ether alcohols. Suitable examples are ethanol, propanol, butanol, isobutanol, cyclohexanol, butyldiglycol or benzyl alcohol.

The aqueous softener formulation (D) may also include a mixture M9 including
- 0–80% by weight, preferably 50–80% by weight of the component (I) already defined for the mixture M1,
- 0–30% by weight, preferably 10–30% by weight of the component (II) already defined for the mixture M1,
- 0–20% by weight, preferably 2–20% by weight of the component (III) already defined for the mixture M1,
- 0–20% by weight of the component (IV) already defined for the mixture M1,
- 0–50% by weight of the component (VI) already defined for the mixture M1,
- 0–80% by weight of a component (XV) which is the reaction product of a saturated or unsaturated $C_{18}$–$C_{22}$-carboxylic acid with amines selected from the group consisting of diethylenetriamine, triethylenetetramine and dimethylaminopropylamine,
- 0–50% by weight of a component (XVI) which is a paraffin having a melting point of 50–120° C.,
- 0–50% by weight of a component (XVII) which is a vegetable oil, preferably refined rapeseed oil,
- 0–30% by weight of stearoylsarcoside (XVIII),
- 0–80% by weight of a component (XIX) which is sulphonated beef tallow,
- 0–50% by weight of a component (XX) which is paraffinsulphonic acid or its alkali or alkaline earth metal salts, where all the aforementioned weight % ages are each based on the total mixture M9 and the sum total of the components (I), (II), (III), (IV), (VI), (XV), (XVI), (XVII), (XVIII), (XIX) and (XX) in the mixture M9 is 10–90% by weight.

In the mixture M9, the acylated alkanolamines (I) which, as already described, are obtainable by reacting saturated or unsaturated $C_{12}-C_{22}$-carboxylic acids with alkanolamines containing 1 or 2 nitrogen atoms, 1–3 OH groups and 2–6 carbon atoms in a molar ratio of (1–3):1, may also be present in quatemized or protonated form. Examples of suitable quatemizing agents are methyl chloride, dimethyl sulphate, dimethyl phosphite or ethylene oxide, in the latter case the reaction being carried out in a solution rendered acidic with sulphuric acid or phosphoric acid.

In the mixture M9, the component (XV) may also be quaternized, protonated or crosslinked with $C_4-C_{18}$-diisocyanates, preferably hexamethylene diisocyanate (HDI), 4-methyl-m-phenylene diisocyanate (TDI) or 4,4'-methylenebis(phenyl isocyanate) (MDI).

Component (XVII) is a vegetable oil, preferably refined rapeseed oil, which consists essentially of erucic acid, as triglyceride with oleic acid, linoleic acid and linolenic acid.

Component (XVIII) is the reaction product of stearoyl chloride and sarcosine, optionally also in the form of an alkali metal salt, especially sodium salt.

Component (XIX) is based on beef tallow as animal fat containing various fractions of myristic acid, palmitic acid, stearic acid, oleic acid and linoleic acid in the form of the respective triglycerides. This beef tallow is, for example, sulphonated using oleum and neutralized with alkali.

Component (XX) is a paraffinsulphonic acid or a salt thereof. Suitable paraffin-sulphonic acids and salts include straight-chain or branched, saturated or unsaturated hydrocarbons having 12–20 carbon atoms and sulphonic acid groups and/or sulphonate groups. Component (XX) has a surface-active effect.

The above-described aqueous mixtures M1 to M9 are prepared by heating the respective components of these mixtures, if necessary, to above the melting point and stirring them together until homogeneous after addition of an appropriate amount of preferably warm water. After cooling to room temperature, aqueous softener formulations (D) are obtained in the form of liquid stable solutions or emulsions containing 10–90% by weight, preferably 10–80% by weight, of softener compounds, based on the aqueous softener formulation. The aqueous mixtures M1 to M9 thus obtained are added to component K1 of the textile treatment composition of the invention. The component K1 of the textile treatment composition of the invention is prepared by mixing the respective components (A)–(D) in any order.

Preference is given to such components K1 that contain 0–20% by weight of polyalcohols (A), 0–20% by weight of polyalcohols (B), 0.1–8% by weight of ethylene oxide adducts (C) and 80–95% by weight of the softener formulation (D), the sum total of (A) and (B) being >0. 1% by weight, based on the sum total of the individual components (A) to (D).

Preference is further given to components K1 which contain (A) 0.1–30% by weight of the compound according to the formula 2(5)

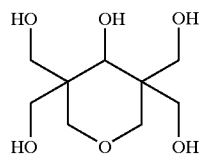

but no component (B).

Particular preference is further given to components K1 which contain (A) 0.1–30% by weight of the compound according to the formula 2(5),

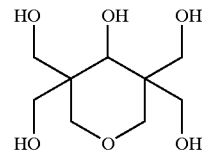

no component (B), (C) 0.1–10% by weight of adducts of $C_{12}-C_{22}$ fatty acids or $C_8-C_{18}$ fatty alcohols or $C_{12}-C_{36}$-alkyl- or di-($C_{12}-C_{36}$)-alkyl-amines or $C_9-C_{24}$-alkylphenols with 2–100 mol of ethylene oxide, and (D) 70–99.9% by weight of an aqueous softener formulation which includes 10–90% by weight of softener compounds, based on the aqueous softener formulation, where all the aforementioned weight % ages are each based on the component K1 and the aqueous softener formulation (D) used is one or more of the above-described mixtures M1 to M9.

Particular preference is further given to components K1 which contain (B) 0.1–30% by weight of a polyalcohol which has more than two OH groups and does not come within the definition of (A), but no component (A), Component B is here in particular trimethylpropane, pentaerythritol, glucose or a mixture thereof.

Particular preference is further given to components K1 which contain (B) 0.1–30% by weight of a polyalcohol which has more than two OH groups and does not come within the definition of (A), no component (A), (C) 0.1–10% by weight of adducts of $C_{12}-C_{22}$ fatty acids or $C_8-C_{18}$ fatty alcohols or $C_{12}-C_{36}$-alkyl- or di-($C_{12}-C_{36}$)-alkyl-amines or $C_9-C_{24}$-alkylphenols with 2–100 mol of ethylene oxide, and (D) 70–99.9% by weight of an aqueous softener formulation which includes 10–90% by weight of softener compounds, based on the aqueous softener formulation, where all the aforementioned weight % ages are each based on the component K1 and the aqueous softener formulation (D) used is one or more of the above-described mixtures M1 to M9.

The polyisocyanate prepolymers which are used as component K2 and whose isocyanate groups are present in bisulphite-blocked form are known in principle. Their preparation is described for example in U.S. Pat. No. 3,898, 197, GB-A-1,062,564, and DE-C-24 14 470 and its counterpart U.S. Pat. No. 3,984,365, which are hereby expressly incorporated by reference. The polyisocyanate prepolymers possess on average at least two isocyanate groups blocked by bisulphite and have no free isocyanate groups. The bisulphite-blocked polyisocyanate prepolymers preferably have a functionality of 2–4.

The bisulphite-blocked polyisocyanate prepolymers are customarily prepared by initially reacting excess amounts of polyisocyanates with polyhydroxy compounds. Excess polyisocyanate ensures that all hydroxyl groups will react and that the reaction product, the polyisocyanate prepolymer, contains free isocyanate groups. These free isocyanate groups are subsequently blocked with bisulphite, especially sodium bisulphite or potassium bisulphite.

The polyhydroxy compounds to be used for preparing the polyisocyanate prepolymers have at least two hydroxyl groups. They are preferably di- or trifunctional polyhydroxy polyethers of the molecular weight range 500–10,000, especially 1000–5000, which are obtainable in known manner by alkoxylation of di- or trifunctional starter molecules, for example water, ethylene glycol, 1,2-propanediol, 1,3-propanediol, triethanolamine, 1,2,6-hexanetriol, trimethylolpropane or glycerol. Useful starter molecules for the polyhydroxy polyethers also include amines, for example primary or secondary alkyl- or aryl-amines, diamines or polyamines. Preference is given to using ethylenediamine, propylenediamine or hexamethylene-diamine as starter. Preference is given to polyethers prepared using either propylene oxide only or else propylene oxide together with up to 50 mol % of ethylene oxide, based on the total amount of ethylene oxide and propylene oxide. The latter "mixed polyethers" may contain the propylene oxide and ethylene oxide units in random distribution, or else may be the known block polyethers, which contain polypropylene oxide and polyethylene oxide blocks. A block copolymer started on ethylenediamine and containing 55% of propylene oxide and 45% of ethylene oxide units and naturally having a functionality of about 4 is particularly advantageous.

The polyisocyanates to be used for preparing the polyisocyanate prepolymers are preferably aliphatic, cycloaliphatic or aromatic polyisocyanates. Advantageous aliphatic polyisocyanates are diisocyanates of the formula $OCN-(CH_2)_n-NCO$, where n is an integer from 2–16, in particular from 4–6. Preferred examples are hexamethylene diisocyanate and tetramethylene diisocyanate. Examples of suitable cycloaliphatic polyisocyanates are the diisocyanates 1-isocyanato-3,3,5-trimethyl-5-isocyanatomethylcyclohexane, 4,4'-diisocyanatodicyclohexylmethane, 1,4-diisocyanatocyclohexane and 2,4-diisocyanatohexahydrotoluene. Such aliphatic and cycloaliphatic polyisocyanates can be used either individually or else in mixture. Useful aromatic polyisocyanates include for example 2,4-toluene diisocyanate, 2,6-toluene diisocyanate, commercially obtainable mixtures of 2,4-toluene diisocyanate and 2,6-toluene diisocyanate, 4,4'-diphenylmethane diisocyanate or the isomeric xylene, benzene or naphthalene diisocyanates, preferably p-xylylene diisocyanate. These aromatic polyisocyanates can likewise be used individually or in mixture, in which case it is also possible to use mixtures of aliphatic, cycloaliphatic and/or aromatic polyisocyanates.

The polyisocyanate prepolymers are prepared by reacting an excess of the polyisocyanate (for example a 2–10 times molar excess) with the polyhydroxy polyether. If appropriate, unconverted amounts of the polyisocyanate are subsequently removed.

The blocking of the resulting polyisocyanate prepolymer with the sodium or potassium bisulphite may be effected by dissolving the prepolymer in an organic water-compatible solvent and then adding to this solution an aqueous solution of the bisulphite. However, it is also possible to dispense with organic solvent. It is further possible to perform the reaction in the presence of organic or inorganic acids. If an organic solvent is used, it may, if desired, be removed by distillation from the aqueous solution obtained after the blocking reaction. Even in the case of hydrophobic polyethers containing mainly propylene oxide units being used, the hydrophilic bisulphite-blocked isocyanate groups generally ensure adequate product solubility in water. If necessary, however, complete removal of the organic solvent is dispensed with or else further organic solvent is added to the system. In general, the mixing ratios of bisulphite-blocked polyisocyanate prepolymer and organic solvent are determined in such a way that the aqueous solution contains 20–80% by weight of prepolymer and 80–20% by weight of solvent, the solvent being either pure water or else a mixture of water with up to 80% by volume of organic solvent. Useful water-compatible solvents include especially those which have a boiling point below 150° C. Preference is given to the use of ethyl acetate, acetone, ethanol or isopropanol.

In the textile treatment compositions of the invention, the components K1 and K2 are present in a weight ratio of (0.1–5):1, preferably (0.4–2.5):1.

In addition to the abovementioned components K1 and K2, the textile treatment composition of the invention may further include other ingredients of the type customary in the case of textile assistants. These include protective colloids, perfumes, fungicides or bactericides, foam suppressants and UV absorbers.

For greater ease of handling, it is advantageous to prepare aqueous preparations of the textile treatment compositions of the invention. These aqueous preparations contain 10–90% by weight, preferably 30–70% by weight, of the textile treatment compositions of the invention.

The invention further provides a process for finishing natural and synthetic textile materials, where they are treated with the textile treatment compositions of the invention or their aqueous preparations.

This process is effected in particular by treating the textile materials with the textile treatment compositions or their aqueous preparations in an exhaust process (winch beck, jet dyeing machine) or in a dipping, spraying or padding process. For these methods for applying the textile treatment compositions of the invention to the textile, U.S. Pat. No. 3,898,197, GB-A-1,062,564, and DE-C-24 14 470 and its counterpart U.S. Pat. No. 3,984,365 are again incorporated herein by reference.

The textile treatment compositions of the invention are preferably used in an amount of 0.5–5% by weight, preferably 1–4% by weight, in an exhaust process or at 5–50 g/l of liquor, preferably 10–40 g/l of liquor, in a padding process, based on a 100% wet pick-up. The liquor ratios can vary between 1:1 and 30:1, according to the manner of application.

In a particularly advantageous embodiment, the textile treatment compositions of the invention are applied to the textiles in an exhaust process from a short liquor using jet dyeing machines.

The invention further provides natural and/or synthetic textile materials which have been finished with the textile treatment compositions of the invention or their aqueous preparations.

Useful textile materials may comprise natural and/or synthetic fibre materials. Examples of useful natural fibre materials are cellulose fibres such as cotton, filament viscose or staple viscose, and also wool or silk. Examples of useful synthetic fibres are polyamide, polyester or acrylic.

The textile treatment compositions of the invention improve the hydrophilicity of the treated textile materials appreciably while preserving the soft handle and the high surface smoothness.

A further advantage of the textile treatment compositions of the invention is their excellent affinity. Whereas component K2 (bisulphite-blocked polyisocyanate prepolymer), which is known in principle, is on its own very difficult to apply to textiles in an exhaust process, the combination of components K1 and K2 in the textile treatment composition of the invention makes it possible to carry out the exhaust process to obtain a durably finished hydrophilic textile material. This result is unexpected, since combining component K2 with a prior art softener (for example the softener described in DE-A-31 38 181)—as well as component K2 alone—leads to inadequate liquor exhaustion when used in an exhaust process.

An additional advantage of the textile treatment compositions of the invention is that textile materials which have been finished with these textile treatment compositions possess appreciably reduced surface resistance and hence antielectrostatic properties. A particular surprise in this context is the permanence of these antielectrostatic properties; the reduced surface resistance is present even after the textile material has been washed repeatedly.

The textile treatment compositions of the invention also have excellent low-temperature storage characteristics. In the case of textile treatment compositions comprising customary softener compositions of the prior art with, for example, paraffins and waxes, the active ingredients will separate out in solid form at low temperatures and are impossible to re-emulsify even by heating. With the textile treatment compositions of the invention, by contrast, it is at all times easily possible to get back to useful emulsions by heating.

EXAMPLES 1–18

The textile substrate used is Helanca polyester interlock.

The hereinbelow described application of inventive and comparative textile treatment compositions is effected by the exhaust process. The tests are carried out on an AHIBA machine at a liquor ratio of 20:1. Inventive and comparative textile treatment compositions are used in an amount of 5–50 g/l of liquor.

The treated materials are assessed with regard to handle and hydrophilicity and the transparency of the liquor is estimated. A clear liquor indicates that the textile treatment composition has exhausted. A cloudy liquor indicates incomplete exhaustion of the textile treatment composition.

Hydrophilicity: measured in terms of the time taken for the substrate to absorb a water droplet.

Handle assessment: the averaged ranking of terry material by 6 people. A handle of 3 is still acceptable.

Component K1

For component K1 the following aqueous mixture M I is initially prepared:

| Individual component | Fraction in % by weight | Mixture M I |
|---|---|---|
| A | 56.1 | polyalcohol as per formula 2(5) |
| C | 5.1 | adduct of 1 mol of oleyl alcohol and 19 mol of ethylene oxide |
|   | 38.8 | softened water |

The following softener formulations 1–8 are prepared as component D for component K1:

| Fraction in % by weight | Individual components |
|---|---|
| Softener formulation 1 | |
| 2.28 | a reaction product of 2 mol of stearic acid, 0.8 mol of behenic acid with 1 mol of aminoethylethanolamine and 1 mol of dimethylamino-3-aminopropane, quaternized with 1 mol of dimethyl sulphate as per DE-A 3 138 181 |
| 3.20 | a 40% aqueous polydimethylsiloxane emulsion having a viscosity of 100,000 mm$^2$/g |
| 17.0 | an 18% aqueous emulsion of the reaction product of 2 mol of stearic acid and 1 mol of triethylenetetramine and 2 mol of acetic acid |
| 12.0 | an 18% aqueous polyethylene wax emulsion, oxidized, drop point 135° C., acid number 30 mg of KOH/g |
| 0.22 | Preventol ® D2 (Bayer AG) preservative |
| 20.9 | an aqueous emulsion consisting of (in % by weight) 13% of a reaction product of 1.9 mol of stearic acid and 1 mol of diethanolamine, - 4.5% of an adduct of 1 mol of stearyl alcohol and 50 mol of ethylene oxide, - 1.0% of Entschäumer E 100 ® (Bayer AG) antifoam - 0.5% of Preventol ® D2 (Bayer AG) preservative - 0.1% of lactic acid - 1.5% of an adduct of 1 mol of oleyl alcohol and 19 mol of ethylene oxide - 79.4% of softened water |
| 44.4 | softened water |
| Softener formulation 2 | |
| 16 | polyethylene wax, oxidized, acid number 30 mg of KOH/g |
| 4 | adduct of 1 mol of Dobanol 23 ® (technical grade $C_{12/13}$ alcohol) and 10 mol of ethylene oxide |
| 80 | completely ion-free water |
| Softener formulation 3 | |
| 15 | polyethylene wax, oxidized, acid number 30 mg of KOH/g |
| 4 | adduct of 1 mol of tallowamine and 2 mol of ethylene oxide |
| 0.5 | phosphoric acid 85% strength |
| 80.5 | completely ion-free water |
| Softener formulation 4 | |
| 80 | softener formulation 2 |
| 5 | branched polysiloxane/polyether copolymer |
| 1.4 | diethanolamine salt of dibutyl phosphate |
| 1 | adduct of 1 mol of dodecanol and 10 mol of ethylene oxide |
| 0.6 | scent |
| 12 | completely ion-free water |
| Softener formulation 5 | |
| 20 | N-formylated aminosilicone |
| 2.5 | cocoalkyldimethylamine oxide |
| 1 | adduct of 1 mol of dodecanol and 10 mol of ethylene oxide |
| 1.25 | isobutanol |
| 75.25 | completely ion-free water |
| Softener formulation 6 | |
| 7.3 | Vestowax ® V 4124 (fr. Hüls) |
| 12.2 | hard paraffin, melting point 108° C. |
| 4.1 | adduct of 1 mol of Dobanol 23 ® and 4 mol of ethylene oxide |
| 3 | $C_{20}$-$C_{22}$ fatty acid mixture condensed with triethylenetetramine and 1,6-hexane diisocyanate |
| 0.6 | 1 mol of cocoamine with 3 mol of ethylene oxide |
| 0.8 | glacial acetic acid |
| 72 | completely ion-free water |
| Softener formulation 7 | |
| 45 | polydimethylsiloxane from the polymerization of octamethylcyclotetrasiloxane |
| 15 | 10% of pentadecylsulphonic acid and 90% of water |
| 1.7 | 71% of $C_8$-$C_{18}$ paraffinsulphonate and 29% of water |
| 1.5 | adduct of 1 mol of dodecanol and 5 mol of ethylene oxide |
| 0.75 | triethanolamine |
| 36.05 | completely ion-free water |

-continued

| Fraction in % by weight | Individual components |
|---|---|
| | Softener formulation 8 |
| 13 | a reaction product of 2 mol of stearic acid, 0.8 mol of behenic acid with 1 mol of aminoethylethanolamine and 1 mol of dimethylamino-3-aminopropane, quaternized with 1 mol of dimethyl sulphate |
| 26 | an 18% polyethylene wax emulsion, oxidized, drop point 135° C., acid number 30 mg of KOH/g |
| 4.8 | a 40% aqueous emulsion of polydimethylsiloxane having a viscosity of 100,000 mm$^2$/s |
| 1.4 | Rilanit ® STS-T (Henkel KGaA) |
| 54.5 | completely ion-free water |

Component K2

Component K2 is prepared by reacting 1.55 mol of polyether P1 with 4.65 mol of hexamethylene diisocyanate at 80–85° C. Once a viscosity of 3500–4000 mPas is attained, the reaction product obtained is added to 3.88 mol of NaHSO$_3$ (used as 40% aqueous solution), followed by 0.62 mol of acetic acid. Water is added to adjust the solids content of the solution to 30%.

The polyether P1 is prepared by reacting 1 mol of ethylenediamine with 13 mol of propylene oxide and 14 mol of ethylene oxide at 130–140° C.

The following textile treatment compositions are used:

| Fraction in % by weight | Components |
|---|---|
| | Textile treatment composition C 1: (comparative 1) |
| 50.0 | softener formulation 1 |
| 50.0 | a 20% aqueous solution of mixture M I |
| | Textile treatment composition 1: (inventive) |
| 25.0 | softener formulation 1 |
| 25.0 | a 20% aqueous solution of mixture M 1 |
| 50.0 | component K2 |
| | Textile treatment composition 2: (inventive) |
| 16.7 | softener formulation 1 |
| 16.7 | a 20% aqueous solution of mixture M I |
| 66.6 | component K2 |
| | Textile treatment composition C 2: (comparative 2) |
| 100 | softener formulation 1 |
| | Textile treatment composition C 3: (comparative 3) |
| 100 | component K2 |
| | Textile treatment composition C 4: (comparative 4) |
| 50.0 | softener formulation 1 |
| 50.0 | component K2 |
| | Textile treatment composition C5: (comparative 5) |
| 33.4 | softener formulation 1 |
| 66.6 | component K2 |
| | Textile treatment composition 3: (inventive) |
| 40 | softener formulation 2 |
| 10 | a 20% aqueous solution of mixture M I |
| 50 | component K2 |
| | Textile treatment composition 4: (inventive) |
| 40 | softener formulation 3 |
| 10 | a 20% aqueous solution of mixture M I |
| 50 | component K2 |
| | Textile treatment composition 5: (inventive) |
| 45 | softener formulation 4 |
| 10 | a 20% aqueous solution of mixture M I |
| 45 | component K2 |
| | Textile treatment composition 6: (inventive) |
| 45 | softener formulation 5 |
| 5 | a 20% aqueous solution of mixture M I |
| 50 | component K2 |
| | Textile treatment composition 7: (inventive) |
| 40 | softener formulation 6 |
| 10 | a 20% aqueous solution of mixture M I |
| 50 | component K2 |
| | Textile treatment composition 8: (inventive) |
| 40 | softener formulation 7 |
| 10 | a 20% aqueous solution of mixture M I |
| 50 | component K2 |
| | Textile treatment composition 9: (inventive) |
| 45 | softener formulation 8 |
| 5 | a 20% aqueous solution of mixture M I |
| 50 | component K2 |

TABLE 1

Table 1 below recites the properties of each of the polyester samples treated.

| Example | Textile treatment composition | Use in liquor in g/l | Hydro-philicity in seconds | Handle asess-ment | Liquor assessment |
|---|---|---|---|---|---|
| 1 | 1 | 10 | 0 | 2 | clear |
| 2 | 1 | 20 | 0 | 1 | clear |
| 3 | 2 | 10 | 0 | 2 | clear |
| 4 | C1 | 10 | 0 | 2 | cloudy |
| 5 | C1 | 20 | 0 | 1 | cloudy |
| 6 | C2 | 10 | 8 | 2 | cloudy |
| 7 | C2 | 20 | 12 | 1 | cloudy |
| 8 | C3 | 10 | 2 | 3 | cloudy |
| 9 | C3 | 20 | 1 | 4 | cloudy |
| 10 | C4 | 20 | 2 | 3 | cloudy |
| 11 | C5 | 10 | 1 | 3 | cloudy |
| 12 | 3 | 10 | 0 | 2 | clear |
| 13 | 4 | 10 | 0 | 2 | clear |
| 14 | 5 | 10 | 0 | 2 | clear |
| 15 | 6 | 10 | 0 | 2 | clear |
| 16 | 7 | 10 | 0 | 2 | clear |
| 17 | 8 | 10 | 0 | 2 | clear |
| 18 | 9 | 10 | 0 | 2 | clear |

EXAMPLES 19 AND 20

(Antistatic Finish)

The material used is 100% polyester fine satin, which is finished with the textile treatment compositions I and C3 as described above. Each textile treatment composition is used in an amount of 40 g/l of liquor.

The material thus finished is washed 5 times at 40° C. in a roller bath for 25 minutes each time, thereafter dried at 40° C. for 10 minutes and conditioned in a dry atmosphere for 48 hours.

Before and after the above-described wash, the surface resistance of the finished textile material is measured with a ring electrode according to the method of DIN 54345. The results are summarized below in Table 2 and are compared with the corresponding surface resistances which are measured on the unfinished polyester fine satin.

| Textile treatment composition used for finish | | Surface resistance in $\Omega$ |
| --- | --- | --- |
| 1 | before wash | $7 \cdot 10^6$ |
|   | after wash | $8 \cdot 10^7$ |
| C3 | before wash | $3 \cdot 10^8$ |
|   | after wash | $1 \cdot 10^{13}$ |
| — | before wash | $1 \cdot 10^{11}$ |
|   | after wash | $1 \cdot 10^{13}$ |

What is claimed is:

1. A textile treatment composition comprising
    (K1) a mixture comprising
        (A) 0 to 30% by weight of polyalcohols obtained by reaction, in the presence of alkaline catalysts, of formaldehyde with ketones bearing at least 4 replaceable hydrogen atoms adjacent to the carbonyl group,
        (B) 0 to 30% by weight of polyalcohols having at least two OH groups and not coming within the definition of component (A),
        (C) 0.1 to 10% by weight of adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkylamines, or $C_9$–$C_{24}$-alkylphenols with 2 to 100 mol of ethylene oxide, and
        (D) 70 to 99.9% by weight of an aqueous softener formulation containing 10 to 90% by weight, based on the aqueous softener formulation, of one or more softener compounds, wherein at least one of said softener compounds is a water-soluble, quaternary ammonium salt of the formula (3)

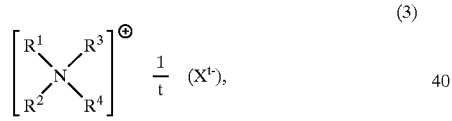

(3)

wherein
        $R^1$ is a $C_{14}$–$C_{25}$-alkyl- or -alkenyl radical that is interrupted by an amide and/or ester group,
        $R^2$ is a radical with the meaning of $R^1$ or a $C_1$–$C_4$-alkyl radical,
        $R^3$ and $R^4$ are independently a $C_1$–$C_4$-alkyl radical, hydroxyethyl, hydroxypropyl, or a benzyl radical, and
        $X^{t-}$ is an anion with t negative charges, where t is 1, 2, or 3,
    wherein the total amount of (A)+(B) is $\geqq 0.1\%$ by weight, based on the sum total of the individual components (A) to (D), and
    (K2) a polyisocyanate prepolymer in which isocyanate groups are present in bisulphite-blocked form,
wherein the weight ratio of component K1 to component K2 is 0.1:1 to 5:1.

2. A textile treatment composition according to claim 1 wherein the polyisocyanate prepolymer is used in the form of an aqueous preparation containing 10 to 70% by weight of the polyisocyanate prepolymer.

3. A textile treatment composition according to claim 1 wherein the polyalcohols (A) in component K1 are compounds of the formulas 2(1) to 2(8)

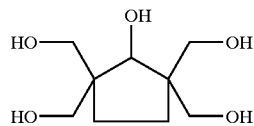
2(1)

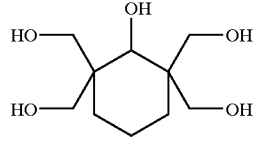
2(2)

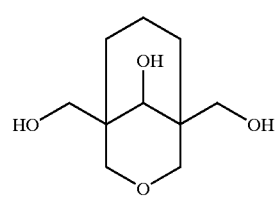
2(3)

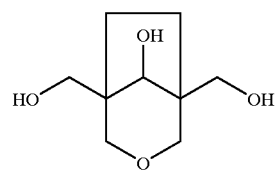
2(4)

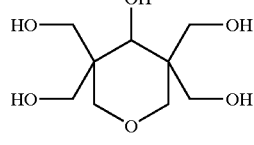
2(5)

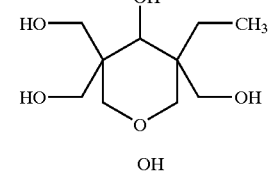
2(6)

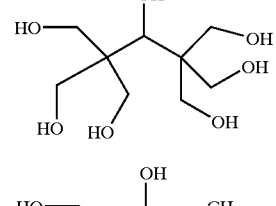
2(7)

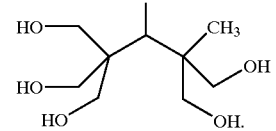
2(8)

4. A textile treatment composition according to claim 1 wherein the polyalcohols (B) of component K1 are pentaerythritol, neopentylglycol, ethylene glycol, diethylene glycol, triethylene glycol, trimethylolpropane, glycerol, polyglycerol, dipentaerythritol, diglycerol, glucose, or a carbohydrate having more than 2 OH groups.

5. A textile treatment composition according to claim 1 wherein the ethylene oxide adducts (C) of component K1 are adducts of stearyl alcohol with 19, 56, or 95 mol of ethylene oxide, adducts of oleyl alcohol with 19, 56, or 95 mol of ethylene oxide, adducts of stearic acid with 6.5, 8.5, and 10 mol of ethylene oxide, adducts of oleic acid with 6.5, 8.5, or 10 mol of ethylene oxide, or adducts of tallowamine with 2, 4.5, 10, 22, or 25 mol of ethylene oxide.

6. A textile treatment composition according to claim 1 wherein the aqueous softener formulation (D) of component K1 is an aqueous solution of a mixture M1 comprising (I) 50 to 80% by weight of acylated alkanolamines of saturated or unsaturated $C_{12}$–$C_{22}$-carboxylic acids and alkanolamines containing 1 or 2 nitrogen atoms, 1 to 3 OH groups, and 2 to 6 carbon atoms, in a molar ratio of 1:1 to 3:1, (II) 10 to 30% by weight of water-soluble, quaternary ammonium salts of the formula (3)

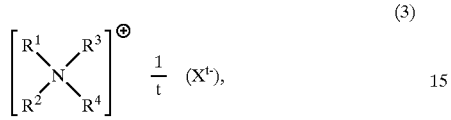

wherein $R^1$ is a $C_{14}$–$C_{25}$-alkyl- or -alkenyl radical that is interrupted by an amide and/or ester group, $R^2$ is a radical with the meaning of $R^1$ or a $C_1$–$C_4$-alkyl radical, $R^3$ and $R^4$ are independently a $C_1$–$C_4$-alkyl radical, hydroxyethyl, hydroxypropyl, or a benzyl radical, and $X^{t-}$ is an anion with t negative charges, where t is 1, 2, or 3, (III) 2 to 20% by weight of fatty acid esters of saturated or unsaturated $C_{12}$–$C_{22}$ fatty acids or saturated or unsaturated $C_4$–$C_{10}$-dicarboxylic acids and monohydric to tetrahydric $C_3$–$C_{20}$ alcohols, (IV) 2 to 20% by weight of ethylene oxide adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkylamines, or $C_9$–$C_{24}$-alkylphenols with 2–100 mol of ethylene oxide, and (V) 0 to 25% by weight of diorganopolysiloxanes having a viscosity of 1000 to 100,000 mm$^2$/s.

7. A textile treatment composition according to claim 6 wherein the aqueous mixture M1 further comprises (VI) 1 to 30% by weight of an oxidized polyethylene wax emulsion, wherein the weight % age of component (VI) is based on the total mixture M1 and the sum total of components (I) to (VI) in the mixture M1 is 10 to 90% by weight.

8. A textile treatment composition according to claim 1 wherein the aqueous softener formulation (D) of component K1 is an aqueous solution of a mixture M3 comprising (I) 50 to 80% by weight of acylated alkanolamines of saturated or unsaturated $C_{12}$–$C_{22}$-carboxylic acids and alkanolamines containing 1 or 2 nitrogen atoms, 1 to 3 OH groups, and 2 to 6 carbon atoms, in a molar ratio of 1:1 to 3:1, (II) 10 to 30% by weight of water-soluble, quaternary ammonium salts of the formula (3)

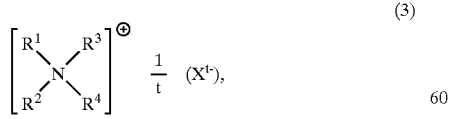

wherein $R^1$ is a $C_{14}$–$C_{25}$-alkyl- or -alkenyl radical that is interrupted by an amide and/or ester group, $R^2$ is a radical with the meaning of $R^1$ or a $C_1$–$C_4$-alkyl radical, $R^3$ and $R^4$ are independently a $C_1$–$C_4$-alkyl radical, hydroxyethyl, hydroxypropyl, or a benzyl radical, and $X^{t-}$ is an anion with t negative charges, where t is 1, 2, or 3, (III) 2 to 20% by weight of fatty acid esters of saturated or unsaturated $C_{12}$–$C_{22}$ fatty acids or saturated or unsaturated $C_4$–$C_{10}$-dicarboxylic acids and monohydric to tetrahydric $C_3$–$C_{20}$ alcohols, (IV) 1 to 20% by weight of ethylene oxide adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkylamines, or $C_9$–$C_{24}$-alkylphenols with 2–100 mol of ethylene oxide, (VI) 1 to 30% by weight of an oxidized polyethylene wax emulsion, and (VII) 1 to 20% by weight of a cationic emulsifier obtained by adduct formation of 2 to 20 mol ethylene oxide and/or propylene oxide with a $C_{10}$–$C_{22}$-alkylamine in the presence of an organic or inorganic acid, where each of the aforementioned weight %ages is based on the total mixture M3 and the sum total of the components (I), (II), (III), (IV), (VI), and (VII) in the mixture M3 is 10 to 90% by weight.

9. A textile treatment composition according to claim 1 wherein the aqueous softener formulation (D) of component K1 is an aqueous solution of a mixture M6 comprising (I) 50 to 80% by weight of acylated alkanolamines of saturated or unsaturated $C_{12}$–$C_{22}$-carboxylic acids and alkanolamines containing 1 or 2 nitrogen atoms, 1 to 3 OH groups, and 2 to 6 carbon atoms, in a molar ratio of 1:1 to 3:1, (II) 10 to 30% by weight of water-soluble, quaternary ammonium salts of the formula (3)

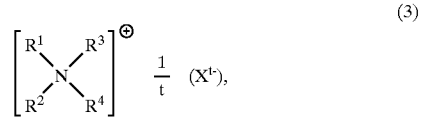

wherein $R^1$ is a $C_{14}$–$C_{25}$-alkyl- or -alkenyl radical that is interrupted by an amide and/or ester group, $R^2$ is a radical with the meaning of $R^1$ or a $C_1$–$C_4$-alkyl radical, $R^3$ and $R^4$ are independently a $C_1$–$C_4$-alkyl radical, hydroxyethyl, hydroxypropyl, or a benzyl radical, and $X^{t-}$ is an anion with t negative charges, where t is 1, 2, or 3, (III) 2 to 20% by weight of fatty acid esters of saturated or unsaturated $C_{12}$–$C_{22}$ fatty acids or saturated or unsaturated $C_4$–$C_{10}$-dicarboxylic acids and monohydric to tetrahydric $C_3$–$C_{20}$ alcohols, (IV) 1 to 20% by weight of ethylene oxide adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkylamines, or $C_9$–$C_{24}$-alkylphenols with 2–100 mol of ethylene oxide, and (XI) 1 to 80% by weight of a polydimethylsiloxane having a viscosity of less than 40 mPas at 23° C., where each of the aforementioned weight %ages is based on the total mixture M6 and the sum total of the components (I), (II), (III), (IV), and (XI) in the mixture M6 is 10 to 90% by weight.

10. A textile treatment composition according to claim 1 wherein the aqueous softener formulation (D) of component K1 is an aqueous solution of a mixture M9 comprising (I) 0 to 80% by weight of acylated alkanolamines of saturated or unsaturated $C_{12}$–$C_{22}$-carboxylic acids and alkanolamines containing 1 or 2 nitrogen atoms, 1 to 3 OH groups, and 2 to 6 carbon atoms, in a molar ratio of 1:1 to 3:1, (II) 10 to 30% by weight of water-soluble, quaternary ammonium salts of the formula (3)

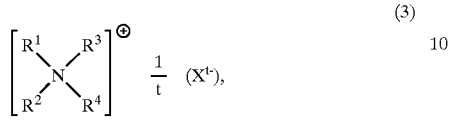
(3)

wherein
$R^1$ is a $C_{14}$–$C_{25}$-alkyl- or -alkenyl radical that is interrupted by an amide and/or ester group,
$R^2$ is a radical with the meaning of $R^1$ or a $C_1$–$C_4$-alkyl radical,
$R^3$ and $R^4$ are independently a $C_1$–$C_4$-alkyl radical, hydroxyethyl, hydroxypropyl, or a benzyl radical, and
$X^{t-}$ is an anion with t negative charges, where t is 1, 2, or 3, (III) 0 to 20% by weight of fatty acid esters of saturated or unsaturated $C_{12}$–$C_{22}$ fatty acids or saturated or unsaturated $C_4$–$C_{10}$-dicarboxylic acids and monohydric to tetrahydric $C_3$–$C_{20}$ alcohols, (IV) 0 to 20% by weight of ethylene oxide adducts of $C_{12}$–$C_{22}$ fatty acids, $C_8$–$C_{18}$ fatty alcohols, $C_{12}$–$C_{36}$-alkyl- or di-($C_{12}$–$C_{36}$)-alkylamines, or $C_{18}$–$C_{24}$-alkylphenols with 2–100 mol of ethylene oxide, (VI) 0 to 50% by weight of an oxidized polyethylene wax emulsion, (XV) 0 to 80% by weight of a reaction product of a saturated or unsaturated $C_{18}$–$C_{22}$-carboxylic acid with amines selected from the group consisting of diethylenetriamine, triethylenetetramine, and dimethylaminopropylamine, (XVI) 0 to 50% by weight of a paraffin having a melting point of 50–120° C., (XVII) 0 to 50% by weight of a vegetable oil, (XVIII) 0 to 30% by weight of stearoylsarcoside, (XIX) 0 to 80% by weight of sulphonated beef tallow, and (XX) 0 to 50% by weight of is paraffinsulphonic acid or alkali or alkaline earth metal salts thereof, where each of the aforementioned weight %ages is based on the total mixture M9 and the sum total of the components (I), (II), (III), (IV), (VI), (XV), (XVI), (XVII), (XVIII), (XIX), and (XX) in the mixture M9 is 10 to 90% by weight.

11. A textile treatment composition according to claim 1 wherein the component K1 contains
   (A) 0.1–30% by weight of a compound according to the formula 2(5)

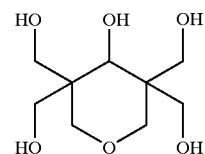
2(5)

but no component (B).

12. A textile treatment composition according to claim 1 wherein the component K1 contains
   (B) 0.1 to 30% by weight of a polyalcohol having more than two OH groups and not coming within the definition of (A),
but no component (A).

13. A textile treatment composition according to claim 1 wherein component (B) is trimethylolpropane, pentaerythritol, glucose, or a mixture thereof.

14. An aqueous preparation comprising 10 to 90% by weight of a textile treatment composition of claim 1.

15. A process for finishing natural and synthetic textile materials comprising treating the textile materials with a textile treatment composition of claim 1.

16. A process according to claim 15 wherein the finishing takes place in an exhaust, dipping, spraying, or padding process.

17. A process according to claim 15 wherein the finishing takes place in an exhaust process from a short liquor using a jet dyeing machine.

18. A process for finishing natural and synthetic textile materials comprising treating the textile materials with an aqueous preparations of claim 14.

19. A process according to claim 18 wherein the finishing takes place in an exhaust, dipping, spraying, or padding process.

20. A process according to claim 19 wherein the finishing takes place in an exhaust process from a short liquor using a jet dyeing machine.

21. A natural or synthetic textile material finished with a textile treatment composition of claim 1.

22. A natural or synthetic textile material finished with an aqueous preparation of claim 14.

* * * * *